J. F. O'CONNOR.
FRICTION GEAR.
APPLICATION FILED SEPT. 2, 1915.

1,290,304.

Patented Jan. 7, 1919.

WITNESSES:
Wm. Geiger

INVENTOR.
John F. O'Connor
BY George T. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR.

1,290,304. Specification of Letters Patent. Patented Jan. 7, 1919.

Application filed September 2, 1915. Serial No. 48,588.

*To all whom it may concern:*

Be it known that I, JOHN F. O'CONNOR, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

In many types of friction gears now in use, the friction shoes and wedges are extended outwardly beyond the ends of the friction shells or cylinders. When these friction gears are first assembled and placed in operation, the parts are adjusted so that there is no appreciable amount of looseness between any of the various elements comprising the friction mechanism. But, as the gear becomes worn in service, there is a tendency for some of the friction elements to become loose within the friction shell or cylinder, and the result may be that the uppermost shoe of the gear when the same is in position on a car, will fall away or separate from the adjacent friction surface of the friction shell, inasmuch as there is no means for forcing said shoe radially against the shell.

If the above described condition is permitted to continue, the parts begin to rattle and the constant jarring and vibration, even when no actuation of the gear takes place, increases very materially the rate of wear on the parts.

The object of my invention is to provide simple and inexpensive means for preventing the above indicated disadvantages in the operation of friction gears.

Figure 1:
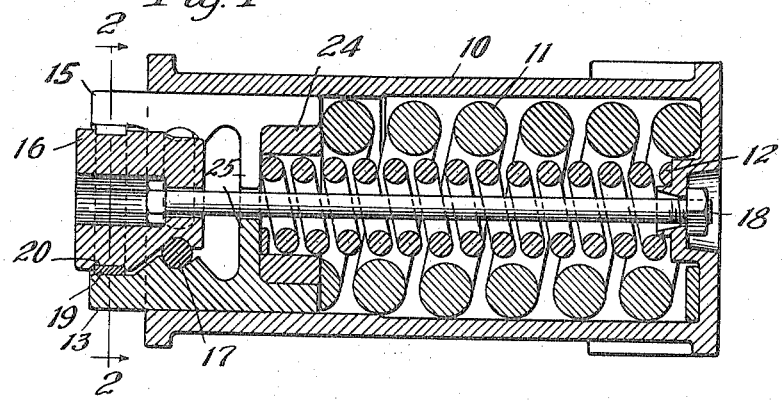
Figure 2:
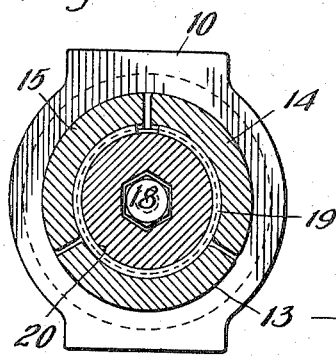
Figure 3:
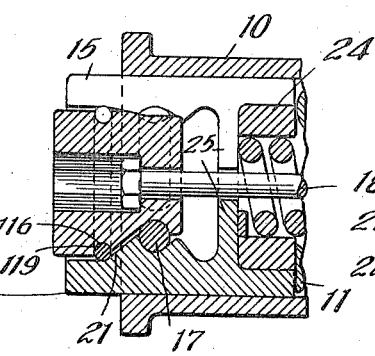
Figure 4:
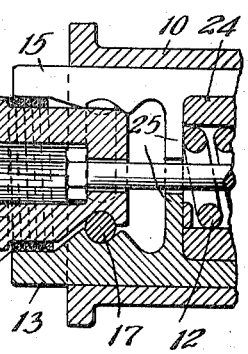
Figure 6:
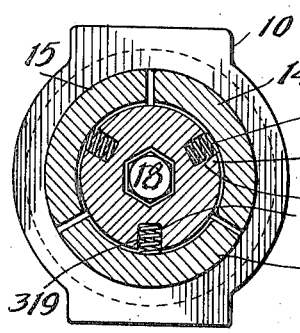
Figure 5:
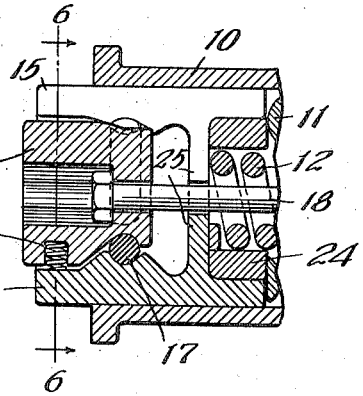

In the drawing forming a part of this specification, Figure 1 is a longitudinal vertical sectional view of a friction gear of a well known type showing my improvements in connection therewith. Fig. 2 is a vertical transverse sectional view of the structure shown in Fig. 1 and taken on the line 2—2 thereof. Figs. 3, 4 and 5 are sectional views similar to Fig. 1, with parts broken away illustrating three other methods of carrying out my invention. And Fig. 6 is a sectional view similar to Fig. 2 taken on the line 6—6 of Fig. 5.

In said drawing, and referring more particularly to Figs. 1 and 2, 10 denotes a combined friction shell and spring cage within which is mounted a main spring consisting of an outer coil 11 and inner coil 12. At its front end, the friction shell has mounted therewithin a plurality of friction shoes 13, 14 and 15, the latter coöperating with the friction shell in a well known manner. Mounted within the shoes and coöperable therewith is a wedge 16, there being interposed a plurality of anti-friction rollers 17 between the wedge and the shoes. A retaining bolt 18 is also provided to hold the parts in assembled position and the spring under an initial compression.

The foregoing parts illustrate one type of the socalled Miner friction gear.

It will be noted that the friction shoes 13, 14 and 15 and the wedge 16 extend outwardly beyond the end of the friction shell, and upon unusual wear of the parts there is a tendency for the upper shoes 14 and 15, when the parts are as illustrated in Fig. 2, to sag or fall away from the friction shell. The lower shoe 13 is properly supported since its center of gravity is well within the end of the friction shell. To prevent the upper shoes from sagging or falling away from the friction shell, I have provided an expansible resilient steel hoop or band 19 which is fitted in a correspondingly shaped annular groove 20 in the wedge 16. As clearly shown in Fig. 2, the steel band 19 is not continuous so that it may readily expand.

From the preceding description, it will be seen that the spring band or hoop 19 will automatically and constantly exert an outward radial pressure on the friction shoes and maintain them in close engagement with the friction shell, thus preventing looseness and rattling of the parts, even though wear occurs.

In the structure shown in Fig. 3, I have shown a spring hoop 119 of circular cross section, the same being seated in a correspondingly shaped annular groove in the wedge 116. This spring hoop is so located as to rest upon inclined seats 21 formed on the inner faces of the friction shoes. This is done in order that the spreading action of the spring band will be maintained against the friction shoes, even though the latter move outwardly relatively to the wedge, due to wear on the parts.

In the structure shown in Fig. 4, I have shown an expansible spring 219, which consists of a number of coils seated on the wedge 216, the latter being provided with an annular shoulder 22 to retain the spring in place.

In the structure shown in Figs. 5 and 6, I have shown a plurality of radially arranged springs 319 seated in radially arranged pockets 23—23 in the wedge, the number of said springs 319 preferably corresponding to the number of friction shoes.

As will be understood from the preceding description, the springs 319 will always exert an outward radial pressure on the friction shoes and maintain them in proper contact with the friction cylinder. In addition, the radial arrangement of the springs 319 will also serve to center the wedge with respect to the shoes.

As clearly shown in Figs. 1, 3, 4 and 5, I have provided an annular bushing 24, which is seated within the inner ends of the friction shoes and bears against the inwardly extending flanges 25 formed on the inner sides of the shoes. The inner end of the bushing 24 is substantially flush with the inner ends of the friction shoes and helps to form a wider bearing for the adjacent end of the outer heavy coil of the main spring.

Although I have herein shown and described what I now consider the preferred means of carrying out my invention, I do not wish to be limited to the exact structures shown and described, since I am aware that the invention may be embodied in other structures than those shown and described. I, therefore, contemplate all structures and modifications as come within the scope of the claims appended hereto.

I claim:

1. In a friction gear, the combination with a friction cylinder, of a plurality of friction shoes circularly arranged within said cylinder and having each an inner wedge face, a wedge disposed within said shoes and having a plurality of wedge faces corresponding to the wedge faces of said shoes, anti-friction rollers interposed between the wedge and shoes, and spring means exerting pressure radially with respect to said shoes to maintain the outer ends thereof in tight engagement with the cylinder.

2. In a friction gear, the combination with a friction shell, friction shoes coöperable therewith, and a wedge, of resilient means interposed between said wedge and shoes to force the latter outwardly, the wedging pressure from said wedge to said shoes being independent of said resilient means.

3. In a friction gear, the combination with a friction cylinder, friction shoes coöperable therewith, and a wedge, of resilient means interposed between said wedge and said shoes, said means exerting an outward radial thrust on the outer ends of said shoes, the wedging pressure from said wedge to said shoes being independent of said resilient means.

4. In a friction gear, the combination with a friction shell, friction shoes coöperable therewith and having wedge faces, the outer ends of said shoes extending outside of the shell in normal position of the parts, a wedge coöperable with said shoes and having wedge faces opposite those of the shoes, anti-friction rollers interposed between the sets of wedge faces, and a spring for resisting movement of the shoes, of a spring device interposed between the wedge and the outer ends of said shoes to thereby maintain the latter in contact with the friction shell.

5. In a friction shock absorber, the combination with a friction shell of cylindrical form, friction elements arranged circularly in engagement with the interior of said shell and movable longitudinally thereof, a spring resisting longitudinal movement of said elements, and a wedge coöperable with said elements and disposed centrally therewithin, of spring means acting radially outward upon said elements and holding the ends of the latter in contact with the interior surface of the friction shell.

In witness that I claim the foregoing I have hereunto subscribed my name this 31st day of July 1915.

JOHN F. O'CONNOR